US009040882B2

(12) United States Patent
Dickson et al.

(10) Patent No.: US 9,040,882 B2
(45) Date of Patent: May 26, 2015

(54) ELECTRIC INDUCTION HEATING OF A RAIL HEAD WITH NON-UNIFORM LONGITUDINAL TEMPERATURE DISTRIBUTION

(75) Inventors: Peter Dickson, Flint, MI (US); Paul F. Scott, Farmington, CT (US)

(73) Assignee: Inductotherm Corp., Rancocas, NJ (US)

( * ) Notice: Subject to any disclaimer, the term of this patent is extended or adjusted under 35 U.S.C. 154(b) by 1046 days.

(21) Appl. No.: 12/194,774

(22) Filed: Aug. 20, 2008

(65) Prior Publication Data

US 2009/0065501 A1 Mar. 12, 2009

Related U.S. Application Data

(60) Provisional application No. 60/971,756, filed on Sep. 12, 2007.

(51) Int. Cl.
| | |
|---|---|
| *H05B 6/10* | (2006.01) |
| *C21D 9/50* | (2006.01) |
| *H05B 6/36* | (2006.01) |
| *C21D 1/42* | (2006.01) |
| *C21D 9/04* | (2006.01) |
| *H05B 6/40* | (2006.01) |

(52) U.S. Cl.
CPC ...... *H05B 6/362* (2013.01); *C21D 1/42* (2013.01); *C21D 9/04* (2013.01); *C21D 2221/00* (2013.01); *H05B 6/40* (2013.01); *H05B 2214/02* (2013.01)

(58) Field of Classification Search
CPC ........ C21D 1/42; C21D 2221/00; C21D 9/04; H05B 2214/02; H05B 6/362; H05B 6/40

USPC ........ 219/635, 660, 602, 624, 637, 646–647, 219/656; 148/146, 150, 320, 145, 581, 108, 148/103, 121, 215, 511, 520, 526, 567, 569, 148/572, 601
See application file for complete search history.

(56) References Cited

U.S. PATENT DOCUMENTS

| 2,170,965 | A | * | 8/1939 | Drake ........................... 324/224 |
| 3,336,459 | A | * | 8/1967 | Seulen et al. ................. 219/642 |
| 3,446,930 | A | * | 5/1969 | Geisel et al. .................. 219/656 |
| 3,489,875 | A | * | 1/1970 | Ross .............................. 219/646 |
| 3,684,851 | A | * | 8/1972 | Reinke et al. ................. 219/639 |
| 3,705,285 | A | * | 12/1972 | Cachat .......................... 219/646 |
| 3,800,115 | A | * | 3/1974 | Cachat .......................... 219/643 |

(Continued)

FOREIGN PATENT DOCUMENTS

| CN | 2147706 | Y | | 11/1993 |
| GB | 933860 | A | * | 8/1963 |

(Continued)

*Primary Examiner* — Dana Ross
*Assistant Examiner* — Ket D Dang
(74) *Attorney, Agent, or Firm* — Philip O. Post (57) ABSTRACT

Apparatus and method are provided for making the longitudinal temperature distribution of the bulbous end of a longitudinally oriented workpiece, such as a rail's head, generally uniform when the head has a non-uniform longitudinal temperature distribution. A combination of crown and skirt electric inductors is used to achieve the generally uniform temperature distribution by modulating the magnetic field intensity produced by current flow through one or more of the combination of crown and skirt inductors as required for the non-uniformly heated regions of the rail's head.

9 Claims, 11 Drawing Sheets

(56) References Cited

U.S. PATENT DOCUMENTS

| | | | |
|---|---|---|---|
| 3,836,743 A * | 9/1974 | Wardwell et al. | 219/635 |
| 4,122,321 A * | 10/1978 | Cachat | 219/650 |
| 4,300,031 A * | 11/1981 | Reboux et al. | 219/617 |
| 4,388,593 A * | 6/1983 | Mittleman | 324/262 |
| 4,749,419 A * | 6/1988 | Sommer et al. | 148/569 |
| 5,004,510 A * | 4/1991 | Yu et al. | 148/569 |
| 5,308,946 A * | 5/1994 | Mohr | 219/645 |
| 5,473,960 A * | 12/1995 | Sakamoto et al. | 74/422 |
| 5,550,353 A * | 8/1996 | Peysakhovich et al. | 219/672 |
| 5,922,234 A * | 7/1999 | Grow et al. | 219/645 |
| 6,570,141 B2 * | 5/2003 | Ross | 219/645 |
| 2005/0081479 A1 * | 4/2005 | Tjoelker et al. | 52/741.1 |

FOREIGN PATENT DOCUMENTS

| | | | |
|---|---|---|---|
| JP | 57137425 A * | 8/1982 | |
| JP | 2002332602 A * | 11/2002 | |
| KR | 2001-0077051 A | 8/2001 | |
| WO | WO 8603646 A1 * | 6/1986 | |

* cited by examiner

ELECTRIC INDUCTION HEATING OF A RAIL HEAD WITH NON-UNIFORM LONGITUDINAL TEMPERATURE DISTRIBUTION

CROSS-REFERENCE TO RELATED APPLICATIONS

This application claims the benefit of U.S. Provisional Application No. 60/971,756, filed Sep. 12, 2007, hereby incorporated by reference in its entirety.

FIELD OF THE INVENTION

The present invention relates to achieving generally uniform rail head temperature along the length of a railroad rail by electric induction heating when the rail head initially has a non-uniform longitudinal temperature distribution.

BACKGROUND OF THE INVENTION

Figure 1A:
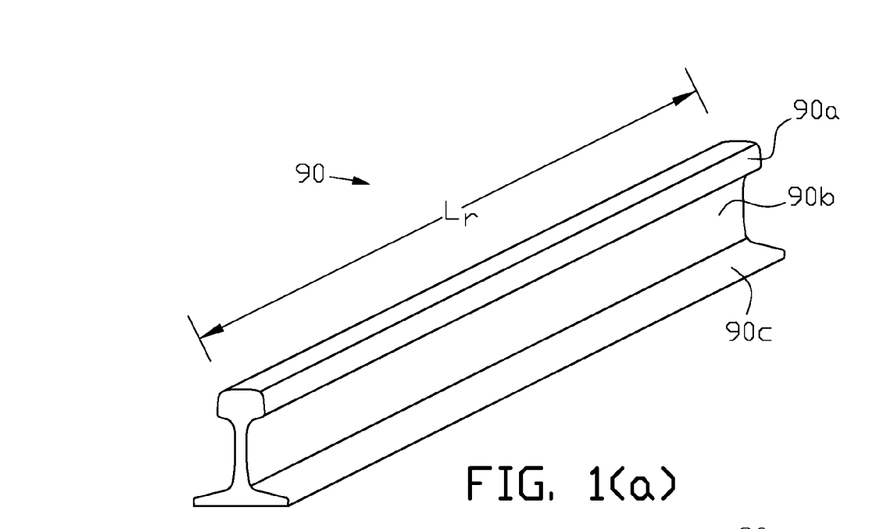
FIG. 1(a) and FIG. 1(b) illustrate one example of a typical railroad rail in perspective and cross section, respectively.
Figure 1B:
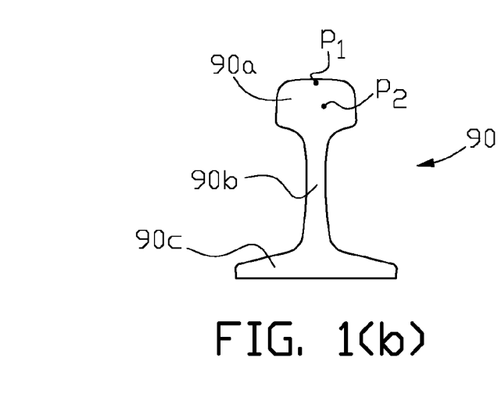
Figure 1C:
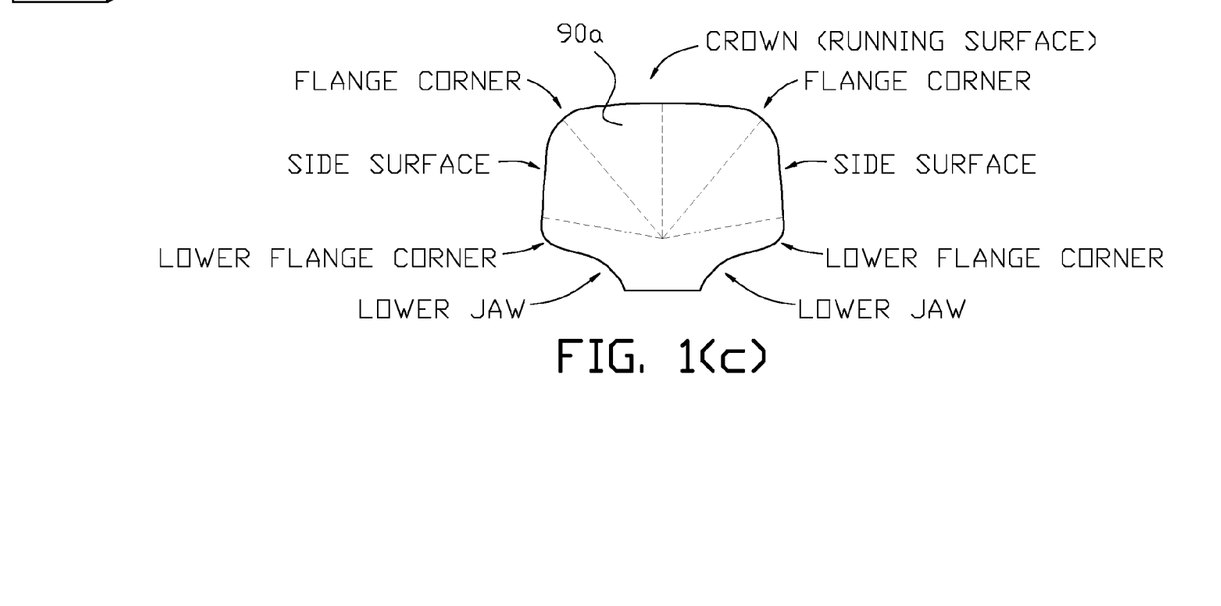
FIG. 1(c) identifies typical nomenclature for various regions of the head section of a typical railroad rail.

Rails used in the construction of railroad track require heat treatment to withstand metallurgical failure in normal use. FIG. 1(a) and FIG. 1(b) illustrate a typical flat-bottom rail 90 comprising head 90a, web 90b and foot 90c. Heat treatment, or metallurgical hardening, is sometimes focused on the rail's head since the head is the region that makes contact with the wheels of rolling stock, while the web connects the head to the foot for distribution of the bearing load to sleepers, or ties, and the bed beneath the rails. FIG. 1(c) illustrates typical terminology that is used to describe approximate regions of the head. The crown, or running surface, is the region making contact with a wheel's rim, while the wheel's flanges generally make contact with one side surface of the head. Lower jaw regions define the region of the head that connects the head to web 90b. Modern railroad design can require relatively long lengths of a continuous rail, for example, in excess of 20 meters. Rails can be fabricated in a hot rolling mill that produces a hot length of rail by forging. Heat treatment of the rail can be accomplished immediately upon exit from the rolling mill by proper scaling of the rail and quenching, for example, with a fluid medium, such as air and/or water. Satisfactory heat treatment of the rail's head must be performed when the cross sectional temperature profile of the head is generally the same along the entire longitudinal length, $L_r$, of the head. One approach is to heat the entire length of rail (that is, the head, web and foot) to the same cross sectional temperature after the rail exits from the hot rolling mill. However such an approach wastes energy since web and foot cross sectional temperature uniformity is not required for effective heat treatment of the rail's head.

One object of the present invention is to provide apparatus for, and a method of, making the cross sectional temperature of a rail's head generally the same throughout the entire length of the rail by electric induction heating after the rail exits a hot rolling mill and before the rail is subjected to a quench process.

BRIEF SUMMARY OF THE INVENTION

Apparatus and method are provided for making the cross sectional temperature of a rail's head generally uniform for the entire length of the rail when the cross sectional temperature is non-uniform for the length of the rail. Combinations of inductors are used to inductively heat sections of the rail's head and achieve the generally uniform cross sectional temperatures for the entire length of the rail. By modulating the magnetic field intensity produced by current flow through one or more of the combinations of inductors, temperatures within regions of the head along the longitudinal length of the rail can be affected to achieve the generally uniform cross sectional temperatures.

In another aspect the present invention is a rail head electric induction heating apparatus comprising at least one crown inductor and an at least one skirt inductor. The crown inductor has a central longitudinal section, and right and left flank longitudinal sections. The right and left flank longitudinal sections each have a length shorter than the length of the central longitudinal section, and are located on opposing sides of the central longitudinal section. The central longitudinal section and right and left flank longitudinal sections are interconnected in different configurations to form the crown inductor. The skirt inductor comprises opposing right and left side skirt inductor sections. The right and left side skirt inductor sections are interconnected in different configurations to form the skirt inductor.

In another aspect the present invention is a method of electric induction heating of the bulbous end of a longitudinally oriented workpiece, such as the head of a rail, wherein at least the bulbous end of the workpiece is electrically conductive. In one electric induction heating process of the invention, the workpiece is passed through at least one crown inductor and at least one skirt inductor, with the bulbous end oriented beneath the crown inductor and between the skirt inductor. The crown inductor comprises a central longitudinal section under which the top of the bulbous end passes through, and right and left flank longitudinal sections within which the flanks of the bulbous end passes though. The skirt inductor comprises opposing right and left side skirt inductor sections through which the sides of the bulbous end passes adjacently through. Alternating current power is applied to the crown inductor and the skirt inductor to generate a magnetic field around the at least one crown and skirt inductors so that magnetic flux couples with the electrically conductive bulbous end to induce heating by eddy current. In another electric induction heating process of the invention, the workpiece may be kept stationary while the crown and skirt inductors move over and around the sides of the bulbous end of the workpiece. In another electric induction heating process of the invention, a combination movement of the workpiece and at least the crown or skirt inductor may be used.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification.

DETAILED DESCRIPTION OF THE INVENTION

Figure 2:
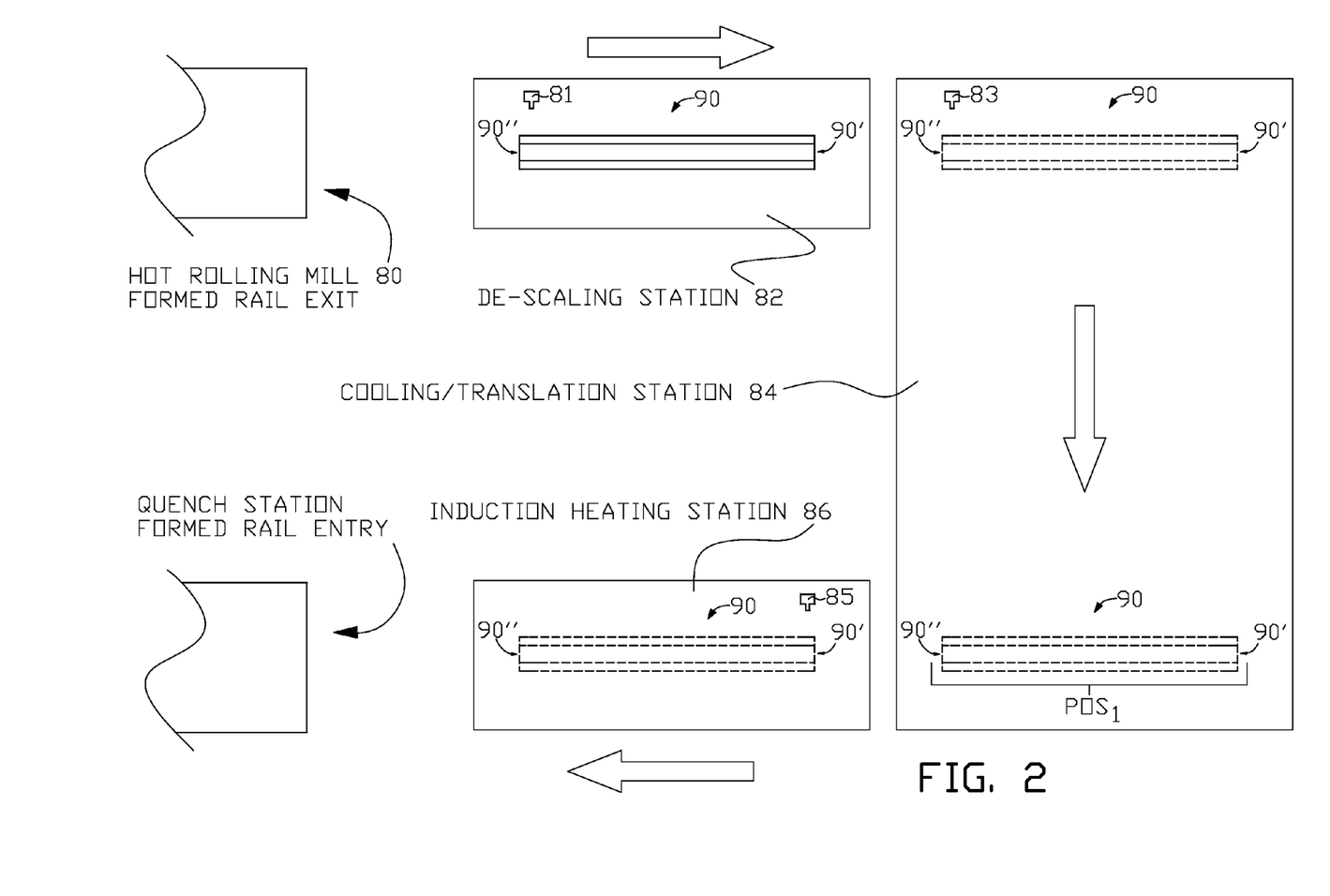
FIG. 2 is a simplified diagrammatic layout of one example of a rail heat treatment process wherein the induction heat treatment of the present invention is utilized.
Figure 3:
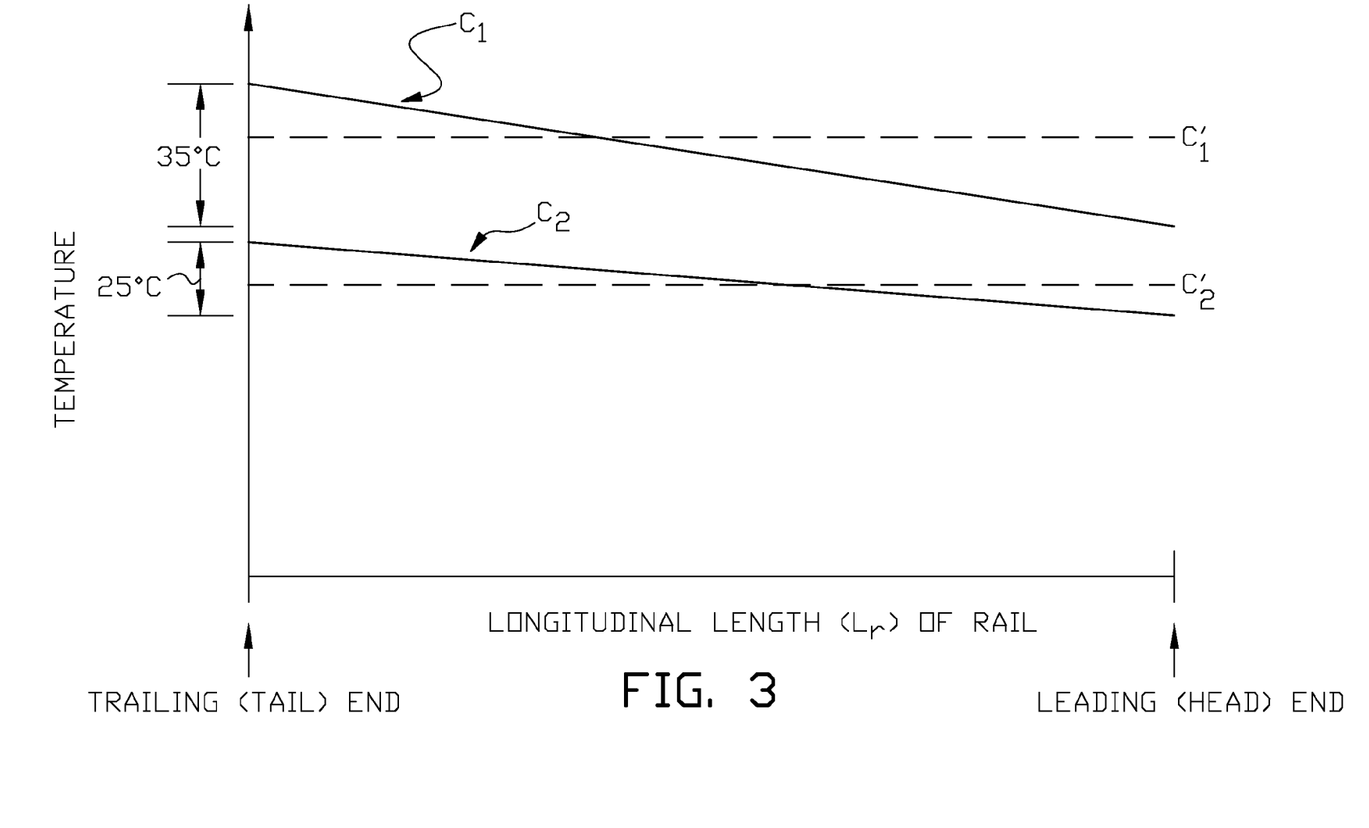
FIG. 3 is a typical graphical illustration of temperature gradients along the longitudinal length of a rail during the fabrication process after exit from a hot rolling mill.

FIG. 2 illustrates one non-limiting example of a rail fabrication process wherein the induction heat treatment process of the present invention is utilized. A hot rail 90 formed in hot rolling mill 80 exits from the rolling mill and moves to de-scaling station 82 with the leading (head) end 90' of the rail followed by the trailing (tail) end 90". The hot rail moves (translates) on a table in cooling/translation station 84 while a controlled scale forms over its surface. Since the leading end 90' of the rail exits the mill first and the length of the rail can be appreciable, the cross sectional temperatures of the rail's head at the leading end can be appreciably lower than at the trailing end as it progresses through the de-scaling and cooling/translation stations. This is graphically illustrated in FIG. 3 wherein curve $C_1$ represents the temperature of typical point $p_1$ in FIG. 1(b) along the length, $L_r$, of the rail when rail 90 has reach position $POS_1$ in FIG. 2. As illustrated in FIG. 3, the temperature for this point $p_1$ can differ by approximately 35° C. between the trailing and leading ends of the rail. Curve $C_2$ represents the temperature of typical point $p_2$ in FIG. 1(b) of the head along the length, $L_r$, of the rail at position $POS_1$, with a temperature difference of approximately 25° C. between the trailing and leading ends of the rail. These curves and temperatures are generalized and illustrate the fact that the relatively hot rail will radiate heat to ambient more rapidly from regions of the rail's head that are closer to the head's surface than from regions deeper in the interior of the head.

In this non-limiting example of the invention, because of the physical layout, rail 90 moves to induction heating station 86 with the trailing end 90" of the rail leading the leading end 90' of the rail. The induction heating station comprises a combination of inductors that are used to inductively heat the cross section of the rail's head to a uniform temperature along its entire length, as further described below, when it enters the induction heating station with a non-uniform temperature along its entire length.

In the drawings an orthogonal space is defined by X, Y and Z axes as illustrated by the diagrams in the drawings for convenience only, and is not intended to be restrictive of the invention.

Figure 4A:
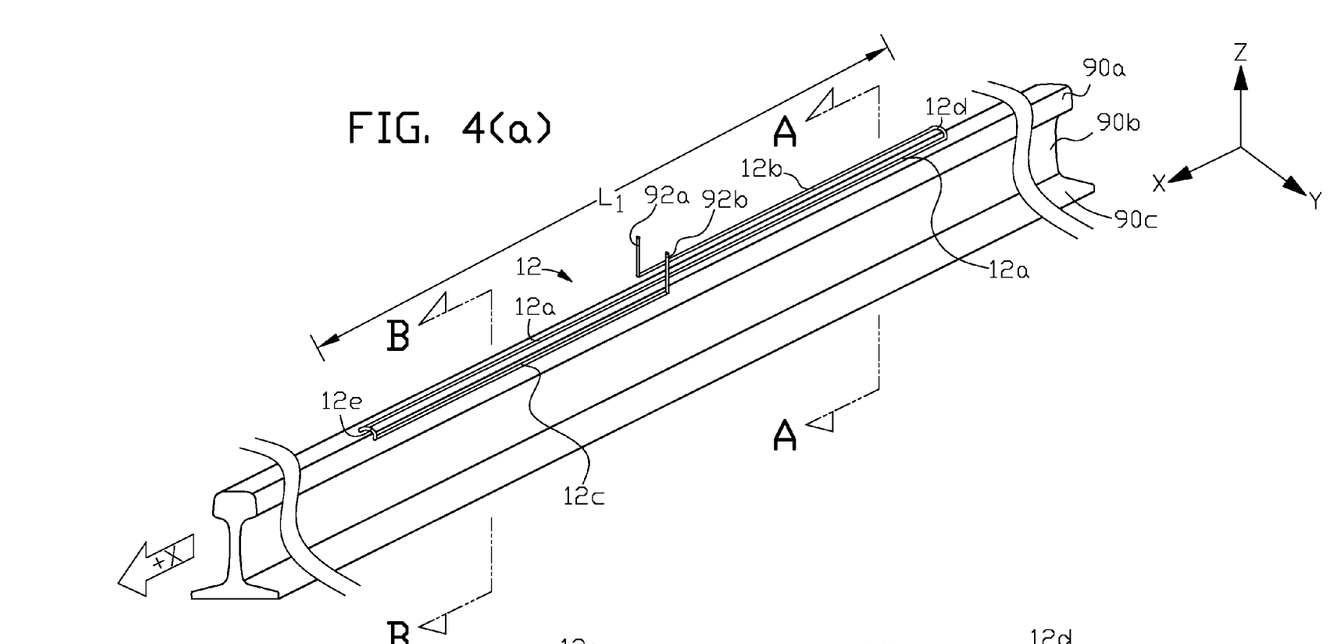
FIG. 4(a) and FIG. 4(b) illustrate in perspective and top plan views, respectively, one example of a crown inductor used in the induction heat treatment process of the present invention.
Figure 4B:
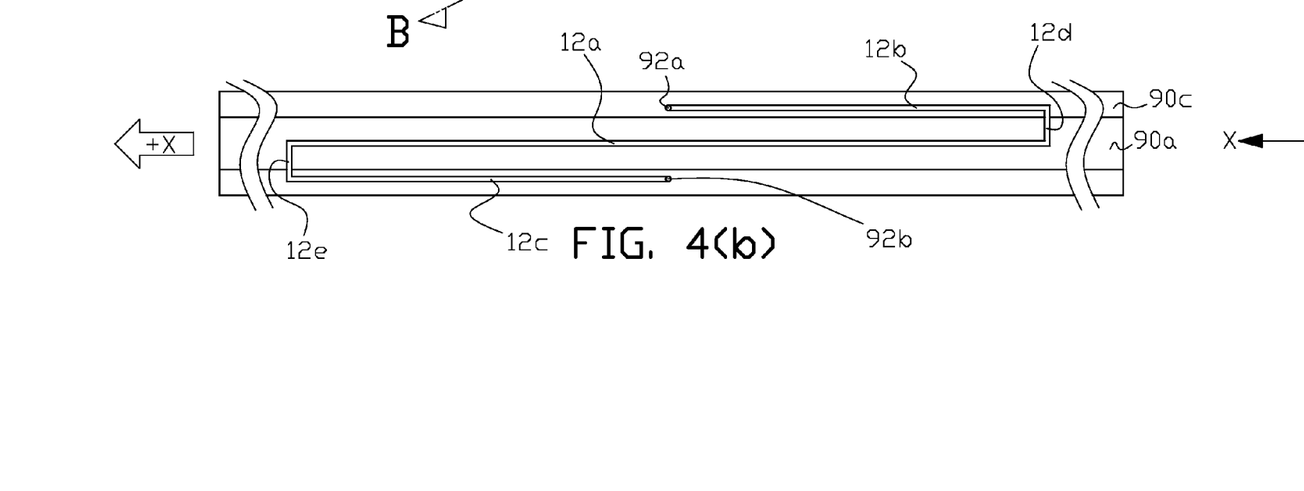
Figure 4C:
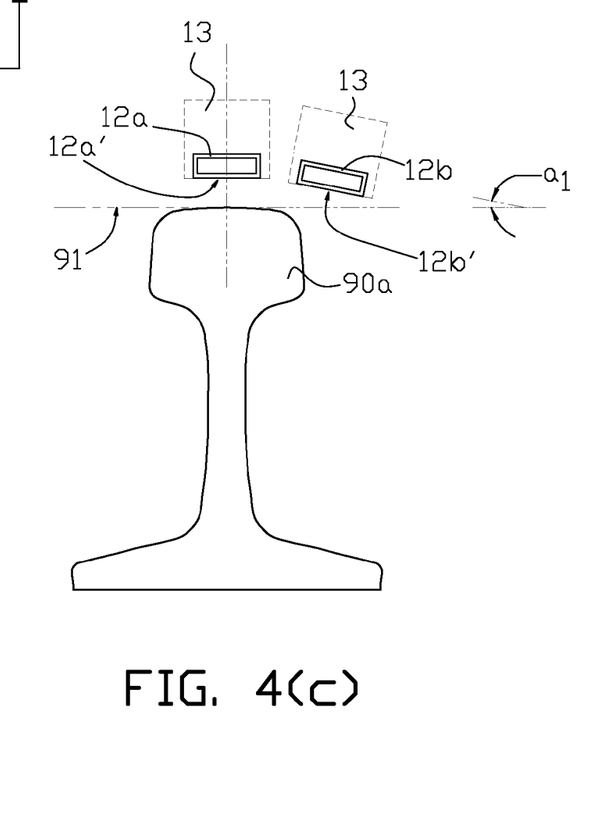
FIG. 4(c) and FIG. 4(d) are cross sectional views of the crown inductor shown in FIG. 4(a) through lines A-A and B-B respectively.
Figure 4D:
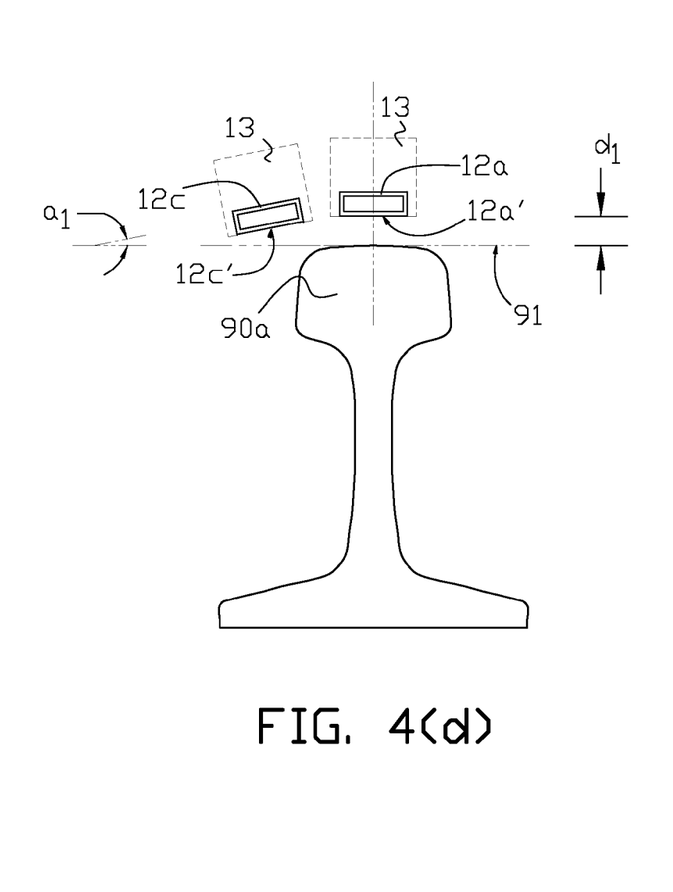
Figure 4E:
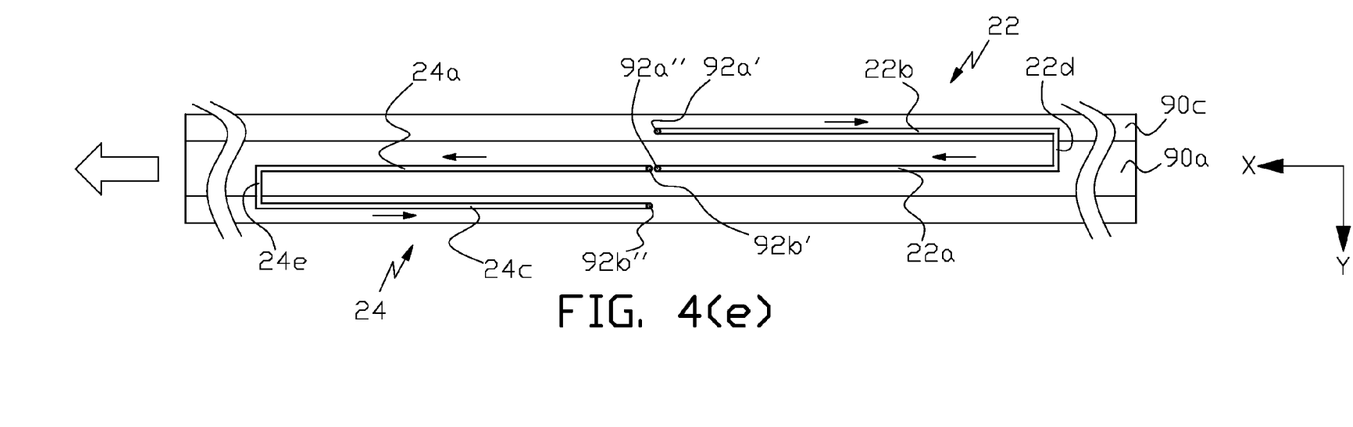
FIG. 4(e) illustrates in top plan view another example of a crown inductor used in the induction heat treatment process of the present invention.

FIG. 4(a) through FIG. 4(d) illustrate one non-limiting example of a crown inductor 12 used in the induction heat treatment process of the present invention. Central section 12a of the crown inductor is disposed over a longitudinal length, $L_1$, of the crown of the rail's head. Generally, if the head is symmetrical in cross section, the central section 12a is centered over the crown of the rail. Magnetic flux established by alternating current (ac) flow through central section 12a generally couples with the top central region of the crown to inductively heat that region. Right flank section 12b of the crown inductor is disposed to the right of the central region (relative to the direction (+X) of a rail moving below the inductor) with its facing surface 12b' angled towards crown surface plane 91 at an angle of $a_1$. Similarly left flank section 12c of the crown inductor is disposed to the left of the central region with its facing surface 12c' angled towards the crown surface plane 91 in this non-limiting example of the invention. Magnetic flux established by ac current flow through the right and left flank sections of the crown inductor generally couples with the regions of the flange corners of the rail's head. Typically both the right and left flank inductors are each approximately one-half the length, $L_1$, of the central section of the crown inductor. In the non-limiting example of the invention shown in FIG. 4(a) through FIG. 4(d), a center ac power feed to crown inductor 12, via electrical conductors, or risers 92a and 92b, is utilized. The risers are suitably connected to a source of ac power, either directly or via intermediate circuit components, such as a transformer. Consequently ends of the right and left flank sections opposite the electrical risers are connected to opposing ends of central section 12a via connecting segments 12d and 12e respectively, to maintain symmetrical magnetic field distributions over the crown and peripheral edges of the crown in the flange corners. Crown inductor facing surface 12a' of the central section 12a is preferably shaped to minimize the cross sectional distance $d_1$ in FIG. 4(c) and FIG. 4(d) between the inductor facing surface and the opposing crown surface of the rail's head. In this non-limiting example of the invention, as illustrated in FIG. 4(a) through FIG. 4(d), crown inductor 12 comprises a hollow rectangularly shaped electrical conductor formed, for example, from copper. In this example, the crown inductor may be cooled by the flow of a fluid medium, such as but not limited to water, through the hollow passage of the inductor. Depending upon the shape of the rail head in a particular application, the crown inductor may be of other shapes. Facing surfaces 12b' and 12c' may be curved in shape, or otherwise configured, to assist in directing magnetic flux to the flange corner regions of the rail's head. As illustrated in FIG. 4(c) and FIG. 4(d) flux concentrator 13 (shown in dashed outline) can be provided around the entire, or partial, length of the crown inductor to direct magnetic flux created by the flow of ac current in the crown inductor, towards the rail's head. A non-limiting alternative example of a crown inductor is illustrated in FIG. 4(e) wherein two separate U-shaped inductors 22 and 24 are utilized with relative instantaneous ac current flow as illustrated by the arrows. In this arrangement the central section of the crown inductor formed by the combination of inductors 22 and 24 comprises partial central sections 22a and 24a, with right flank section 22b and left flank section 24c, and connecting segments 22d and 24e. One or more ac power sources can be connected between end terminals 92a', 92b', 92a" and 92b" to achieve the desired instantaneous current flow.

Figures 5A, 5B:
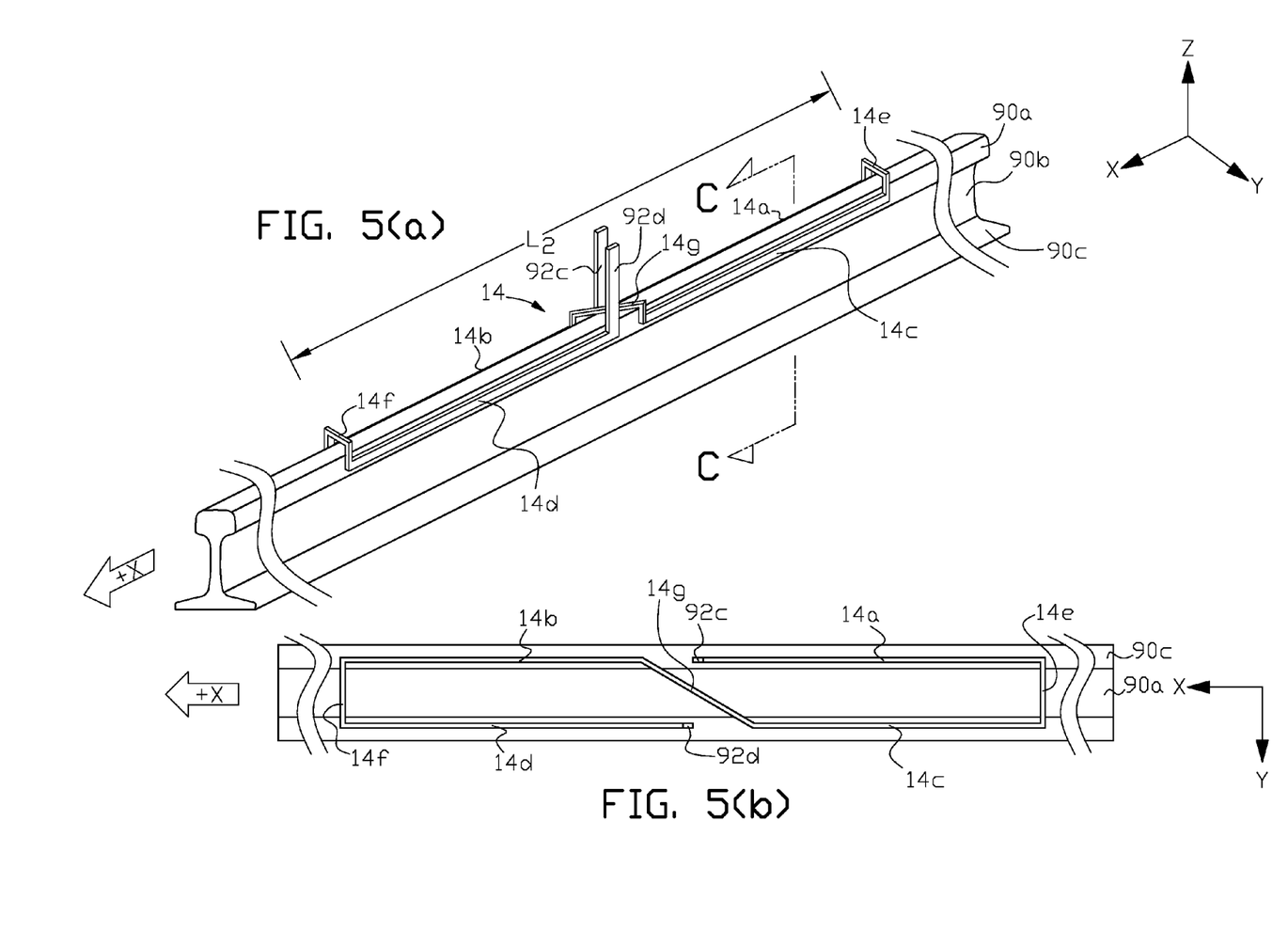
FIG. 5(a) and FIG. 5(b) illustrate in perspective and top plan views, respectively, one example of a skirt inductor used in the induction heat treatment process of the present invention.
Figure 5C:
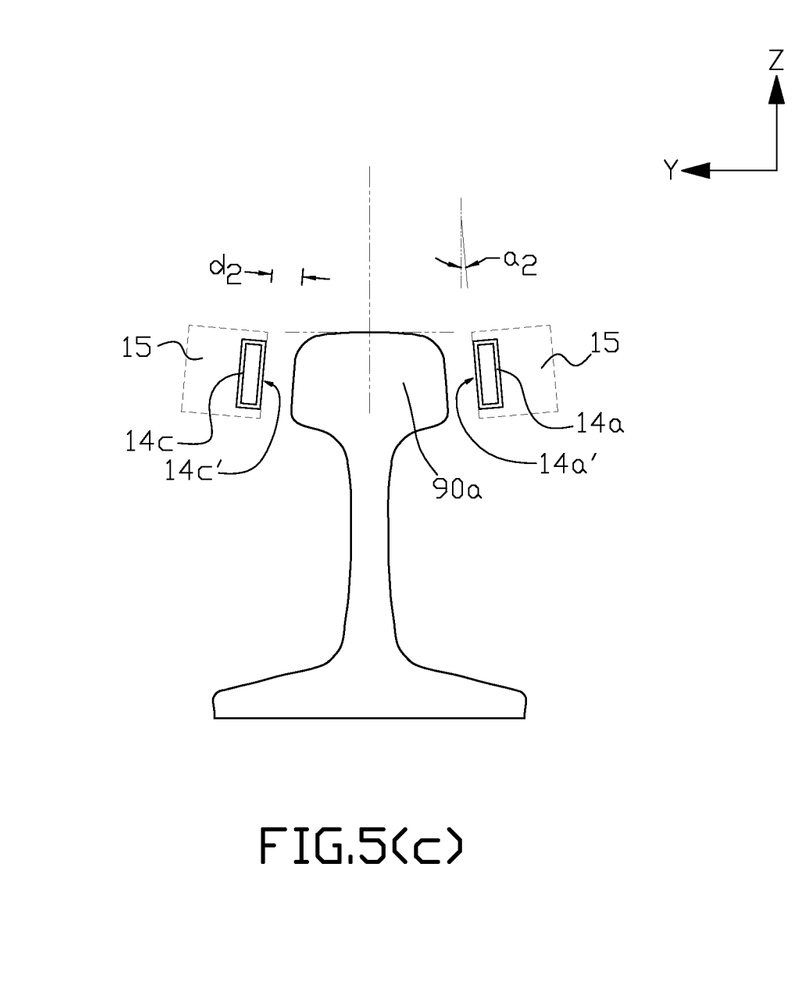
FIG. 5(c) is a cross sectional view of the skirt inductor shown in FIG. 5(a) through line C-C.
Figure 5D:
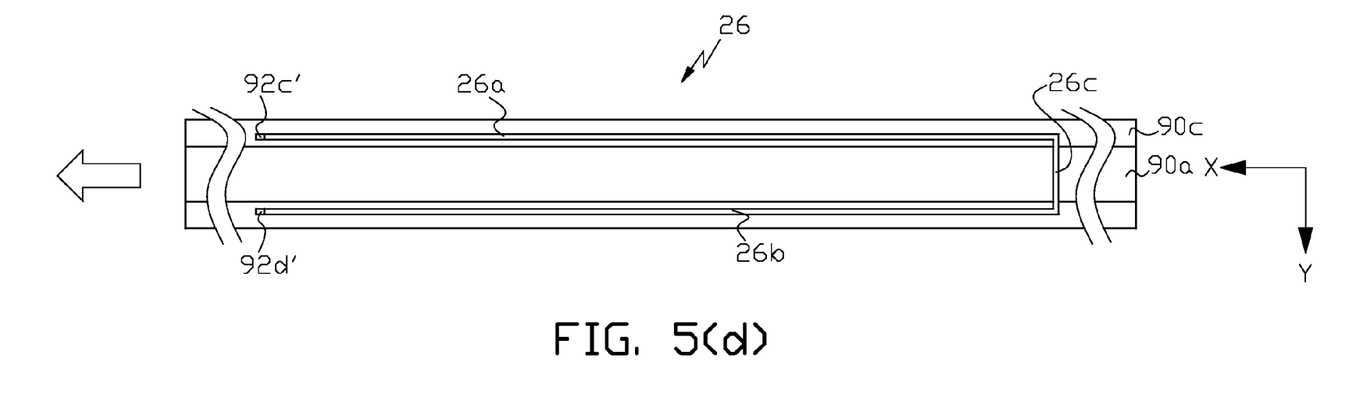
FIG. 5(d) illustrates in top plan view another example of a skirt inductor used in the induction heat treatment process of the present invention.

FIG. 5(a) through FIG. 5(c) illustrate one non-limiting example of skirt inductor 14 used in the induction heat treatment process of the present invention. Right side section of the skirt inductor comprises subsections 14a and 14b, and left side section of the skirt inductor comprises subsections 14c and 14d. Right and left side sections of the skirt inductor are disposed along opposing side surfaces of the rail's head over a longitudinal length, $L_2$. In one example of the invention, subsections 14a, 14b, 14c and 14d are each approximately one-half the length, $L_2$. Adjacent ends of subsections 14a and 14c, and adjacent ends of subsections 14b and 14d, on opposing sides of the rail's head are connected together by connecting segments 14e and 14f, respectively, to maintain symmetrical magnetic field distributions over the top of the head's crown. Cross over segment 14g of the skirt inductor connects adjacent ends of subsections 14b and 14c on opposing sides of the rail's head. This arrangement of subsections of the skirt inductor allow center ac power feed to the inductor via electrical conductors, or risers 92c and 92d, at adjacent ends of subsections 14a and 14d on opposing sides of the rail's head. The risers are suitably connected to a source of ac power, either directly or via intermediate circuit components, such as a transformer. In this example of the invention the skirt inductor facing surfaces 14a', 14b', 14c' and 14d' are angled from vertical (away from each other) at the same angle, $a_2$, (FIG. 5(c)) of the side surface of the rail's head. Skirt inductor facing surfaces 14a', 14b', 14c' and 14d' of the side sections are preferably shaped to minimize the cross sectional distance, $d_2$, in FIG. 5(c) between the inductor facing surface and the opposing side surface of the rail's head. Magnetic flux established by ac current flow through the right and left side sections of skirt inductor 14 generally couples with the side regions of the rail's head to inductively heat those regions. In this non-limiting example of the invention, as illustrated in FIG. 5(a) through FIG. 5(c), skirt inductor 14 comprises a hollow rectangularly shaped electrical conductor formed, for example, from copper. In this example, the skirt inductor may be cooled by the flow of a fluid medium, such as, but not limited to water, through the hollow passage of the inductor. Depending upon the shape of the rail head in a particular application, the skirt inductor may be of other shapes. One or more of the facing surfaces 14a', 14b', 14c' and 14d' may be curved in shape to assist in directing magnetic flux to the side regions of the rail's head. As illustrated in FIG. 5(c) flux concentrator 15 (shown in dashed outline) can be provided around the entire, or partial, length of the skirt inductor to direct magnetic flux created by the flow of ac current in the skirt inductor, towards the rail's head. A non-limiting alternative example of a skirt inductor is illustrated in FIG. 5(d). Skirt inductor 26 comprises opposing side sections 26a and 26b that are located adjacent to opposing sides of the rail's head, and are connected together at adjacent opposing ends by connecting segment 26c. The opposite ends of side sections 26a and 26b are connected to electrical risers 92c' and 92d' for the supply of ac power to the inductor.

Figure 6:
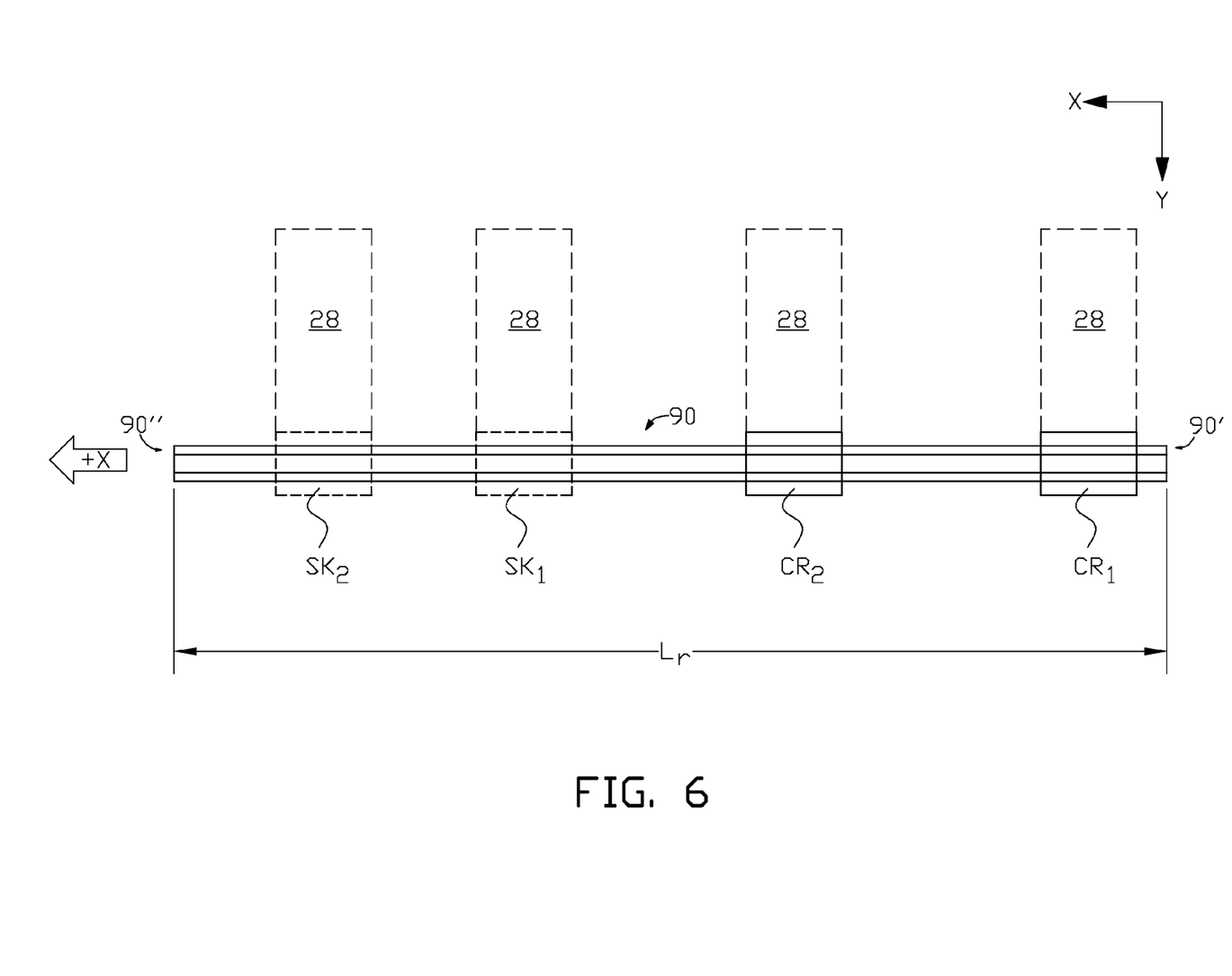
FIG. 6 is a simplified diagrammatic layout of one example of an induction heating station wherein the induction heat treatment process of the present invention is utilized.
Figure 8:
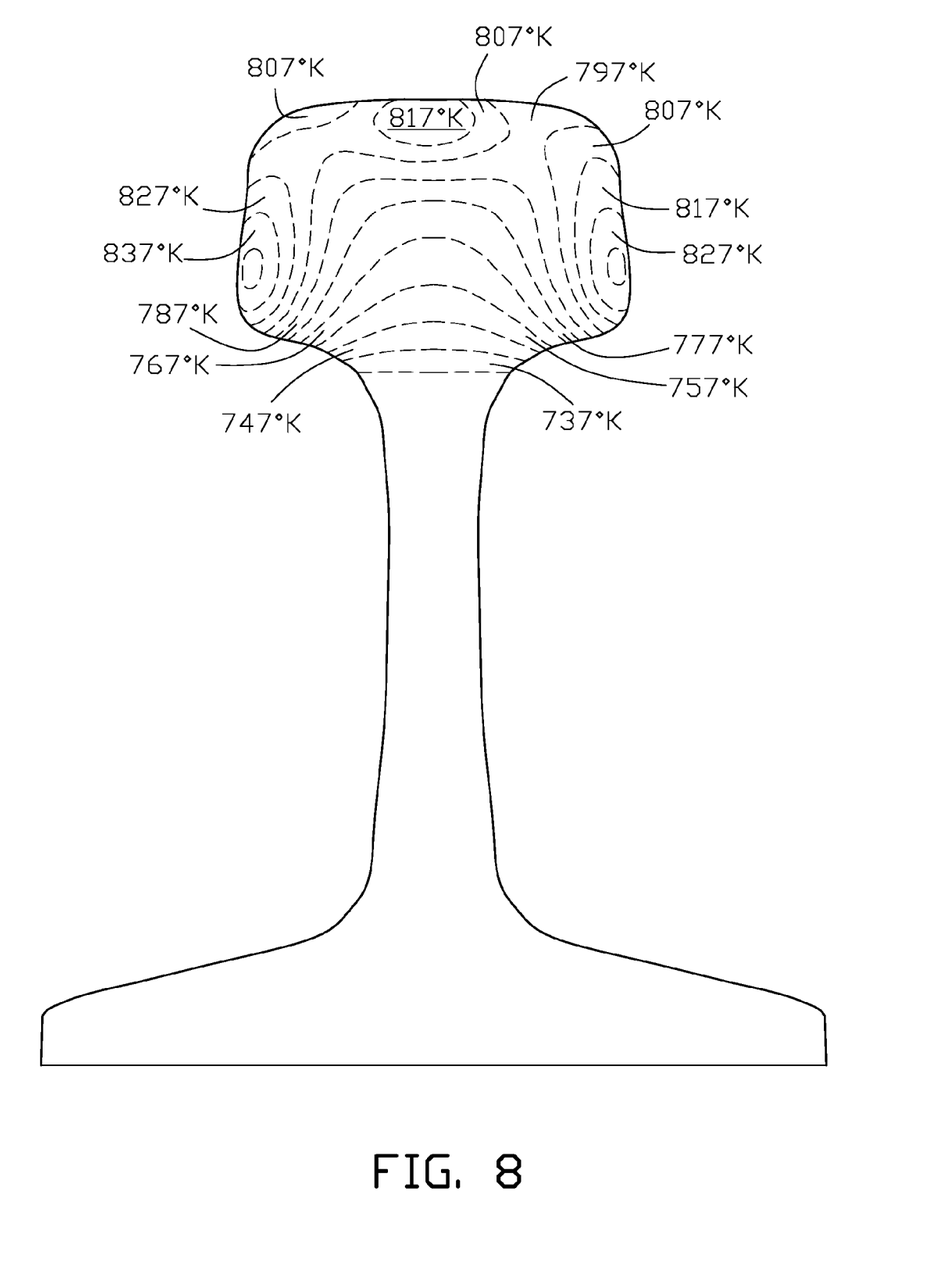
FIG. 8 is one non-limiting example of a cross sectional isotherm for a rail after exiting an induction heating station wherein the induction heat treatment process of the present invention is utilized.

FIG. 6 illustrates one non-limiting arrangement of crown and skirt inductors in induction heating station 86 that may be used to uniformly heat the longitudinal length, $L_r$, of a rail's head that initially has a non-uniform temperature along its length, for example, as previously described above and graphically illustrated in FIG. 3. Movement of rail 90 through the induction heating station is in the +X direction as indicated by the arrow. The line up of inductors in the station, in order from the entry to the exit of the rail is: crown inductor $CR_1$, crown inductor $CR_2$, skirt inductor SK1, and skirt inductor $SK_2$. A typical, but non-limiting length of a crown or skirt inductor may be 1 (one) meter. Utilizing this non-limiting configuration of inductors, with the crown inductor being as described above and illustrated in FIG. 4(a), and the skirt inductor being as described above and illustrated in FIG. 5(a), induction heating of the rail's head is accomplished sequentially in the following order: crown right flank, crown left flank (crown inductor $CR_1$); crown right flank, crown left flank (crown inductor $CR_2$); skirt (skirt inductor SK2); and skirt (skirt inductor SK2). The number and arrangement (for example, the spacing between inductors) of crown and skirt inductors used in a particular application will vary. Generally direct induced heating is limited by the depth of penetration of the induced magnetic field into regions of the rail's head. Induced heat conducts into the interior of the head (referred to as heat "soaking") as the rail progresses through the induction heating station. Consequently completed cross sectional heating of the rail is based upon a combination of induced heating and soaking that can occur between inductors in the induction heating station. Upon exit from the induction heating station, the rail's head will have a substantially uniform cross sectional temperature along the entire length of the rail as illustrated, for example, by curves $C'_1$ and $C'_2$ in FIG. 3 for points $p_1$ and $p_2$, respectively, in FIG. 1(b). FIG. 8 is one non-limiting example of a cross sectional isotherm (10° K intervals indicated by dashed lines) for a substantially uniformly heated rail head after exiting the induction heating station.

Each inductor in the induction heating station is supplied ac power from one or more suitable power sources. As required for a particular application, each inductor may be supplied power from a separate source, or a group of inductors may be supplied power from a single source. Power may be supplied directly from the source, or via intermediate circuit components, such as a voltage drop transformer, or power matching transformer. The magnitude of output power (voltage) from a source to an inductor may be kept constant or varied during the induction heating process. The electrical frequency of the output from a source to an inductor may be kept constant or varied during the induction heating process, for example, to vary the depth of penetration of magnetic flux into the region of the rail's head.

Various types of control systems may be used to control the output parameters (for example, power (voltage) and/or frequency) of the one or more power sources as the length of a rail (rail's head) proceeds through the inductors comprising the induction heating station. For example, one or more rail head temperature readings (for example with a pyrometer) may be accomplished prior to the rail entering the induction heating station. These readings may be compared with stored data in a computer processing system that analyzes the readings and continuously adjusts the required output parameter(s) of the one or more power sources. Computer analysis and stored data may be based upon prior trial runs for rails of different dimensions and values of the output parameter(s) that achieve the required uniform temperature of the rail's head.

In other examples of the invention, acquisition of the non-uniform rail head temperature profile in the +X direction of successive rails moving to the quench station may be accomplished by scanning the rail as it moves past one or more temperature detectors, such as pyrometers 81, 83 and/or 85, in one or more of the de-scaling, cooling/translation, and/or the induction heating stations shown in FIG. 2. Alternatively one or more temperature detectors may move in the X direction along a rail stationary in the X direction to scan the rail while the rail is cooling. One or more of these detectors may measure the entire rail head temperature, or may separately measure the crown, skirt and/or the lower jaw region temperatures of the head.

The acquired temperature readings (data) may be stored in a suitable memory device and used in an algorithm (executed by software) in a computational device (such as a computer processor). The output of the algorithm can be used to modulate the time that the magnetic field intensity supplied from current flow in the utilized crown and skirt inductors, either individually or in combination, as the rail passes through the inductors after, or during, acquisition of the temperature data. For example if the acquired (measured) temperature at a point along the length, $L_r$, of the rail in the crown, skirt or lower jaw region is lower than the temperature desired for the optimum metallurgical change during quenching, the algorithm would calculate the required increase in the magnetic field intensity at the time that the point passed under the respective crown and/or skirt inductors. This increase in magnetic field intensity would have the effect of eliminating the non-uniform temperature profile as shown, for example, in FIG. 3. Conversely if the acquired (measured) temperature at a point along the length, $L_r$, of the rail in the crown, skirt or lower jaw region is higher than the temperature desired for the optimum metallurgical change during quenching, the algorithm would calculate the required decrease in the magnetic field intensity at the time that the point passed under the respective crown and/or skirt inductors. The algorithm would also factor in cooling of the rail head at the point that takes place between the time of temperature scanning (acquisition) and the time that the point arrives under the respective inductor.

In other examples of the invention one or more temperature sensing devices can be installed along the length of the induction heating station to dynamically sense the head's temperature so that output parameter(s) of the one or more power supplies can be adjusted as the rail's head proceeds through the induction heating station.

In other examples of the invention the system may be adaptively adjusted by measuring the temperature at one or more locations along the length of the rail's head after exiting the induction heating station, identifying any regions of non-uniform temperature reading, and adjusting the output parameters of the one or more power sources to correct the non-uniform temperatures for the next rail entering the induction heating station to be inductively heated.

Each inductor may be air cooled, or cooled by circulating a cooling medium, such as a liquid or gas, either through the inductor (for example, if the inductor has a hollow passage) or around the inductor. An inductor may be packaged in a closed container, except for entry and exit passages for the rail or head, and a cooling medium may be circulated through the closed container.

In other examples of the invention, an inductor may be a combination crown and skirt inductor that can comprise, for example, the combination of a crown inductor's central section and one or more side sections of a skirt inductor, or the combination of a crown inductor's central and flank section(s) and one or more side sections of a skirt inductor.

Figure 7A:
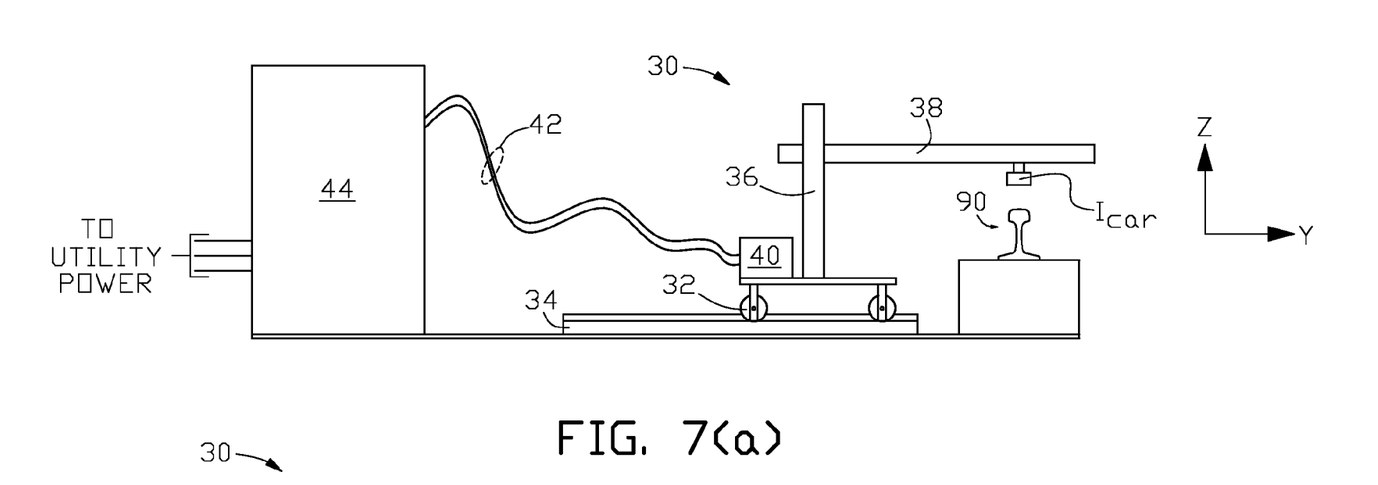
FIG. 7(a), FIG. 7(b) and FIG. 7(c) are simplified diagrammatic arrangements in side elevation, rear elevation and top elevation views, respectively, of an inductor transport apparatus used with one example of the induction heat treatment process of the present invention.
Figure 7B:
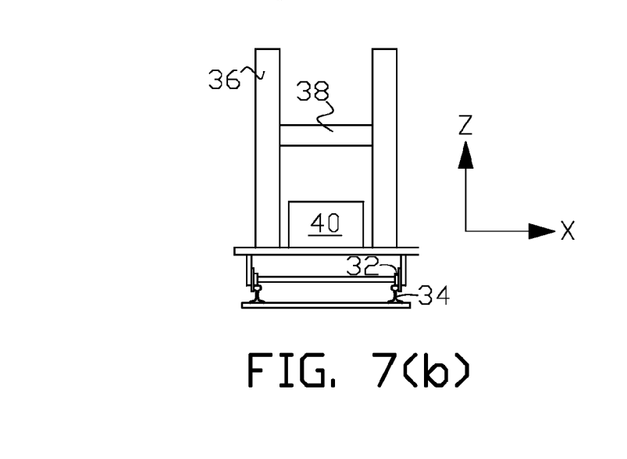
Figure 7C:
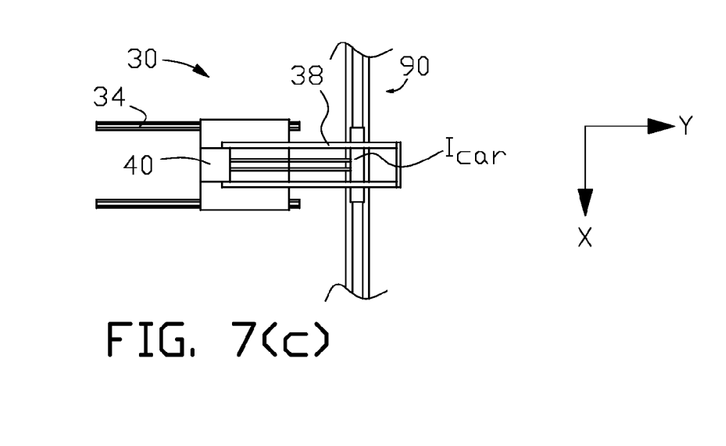

In some examples of the invention, the crown and/or skirt inductors may be permanently located over and around a rail's head as the rail is advanced through the induction heating station. In other example of the invention one or more of the crown and/or skirt inductors may be moveable, for example, by mounting one or more of the inductors on a carriage 30 as illustrated in FIG. 7(a), FIG. 7(b) and FIG. 7(c). This particular non-limiting carriage arrangement allows movement of inductor, $I_{car}$, which is mounted on the carriage in the Y and Z directions so that the inductor, $I_{car}$, can be moved back (in the minus Y direction), for example, to accommodate rail handling apparatus, and moved up (in the plus Z direction), for example, to accommodate anomalies in the height of the rail's head underneath the crown inductor, and to clear a skirt inductor from the rail's head before a backward movement (in the minus Y direction) is accomplished. Other examples of the invention may include an inductor movement apparatus that can move the inductor in one or more of the X, Y or Z directions.

Carriage 30 in FIG. 7(a), FIG. 7(b) and FIG. 7(c) is mounted on wheels 32 that roll on rails 34 to allow movement of the carriage and mounted inductor in the Y direction. A carriage drive apparatus (for example, an electric motor and sprocket chain drive) can be provided to move the carriage in the plus and minus Y directions. Vertical structural members 36 provide support for moveable (in the Z direction) cantilevered structural member 38 to which the inductor, $I_{car}$, is attached. A vertical drive apparatus (not shown in the figures) for example, a hydraulic or electric/chain drive is used to raise and lower cantilevered structural member 38 with the attached inductor. If required, one or more electrical components, such as voltage step down transformer 40 may be mounted on carriage 30. Electrical conductors 42 (for example, flexible cables or fixed busway) provide power to inductor, $I_{car}$, from suitable power supply 44. Power supply 44 typically, but not by way of limitation, can be a rectifier and inverter combination that rectifies ac input power (for example, utility power) to dc, and then inverts the dc to the required ac output power level and frequency.

Carriages 30 may optionally be used with each of the inductors identified in the arrangement illustrated in FIG. 6 by locating a carriage and associated components for each inductor in the space outlined in dashed lines and designated by element number 28.

A sensor may be suitably positioned to determine if a physical feature of a rail approaching inductor, $I_{car}$, will make abnormal contact with the inductor if it was allowed to pass under the inductor in its present position. If such determination is made, the vertical drive apparatus can be used to raise the inductor and clear the impending abnormal contact.

In the above example of the invention, the rail is moved through the induction heating station (in the X direction) while the inductors are kept in position (relative to the X direction). In other examples of the invention, a rail may be kept stationary and the inductors making up the induction heating station may move over and around the rail's head (in the X direction), or alternatively a coordinated movement of both the rail and one or more of the inductors making up the induction heating station may be utilized to inductively heat the rail's head.

While the above examples of the invention make the cross sectional temperature of the rail's head generally the same for the entire length of the rail after exit from a hot rolling mill, the invention is useful, and can be applied, for making the cross sectional temperature of the rail's head, or similarly configured workpiece, generally the same for the entire length of the workpiece when said cross sectional temperature is non-uniform along the entire length of the workpiece prior to the induction heat treatment process of the present invention.

A similarly configured workpiece may be a longitudinally oriented workpiece having a bulbous end similarly to that of the head of the rail. Only the bulbous end of the workpiece need be electrically conductive for application of the present invention.

The above examples of the invention have been provided merely for the purpose of explanation and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A rail head electric induction heating apparatus comprising:
   a crown inductor comprising a central longitudinal section; a right flank longitudinal section; and a left flank longitudinal section; the right and left flank longitudinal sections each having a length shorter than the length of the central longitudinal section and disposed on opposing sides of the central longitudinal section;
   a skirt inductor comprising opposing right and left side skirt inductor sections; and
   at least one ac power source connected to the crown inductor and skirt inductor.

2. The rail head electric induction heating apparatus of claim 1 wherein the central longitudinal section having an opposing first and second central section ends, the right flank longitudinal section having an opposing first and second right flank section ends, the left flank longitudinal section having an opposing first and second left flank section ends; the first right flank section end connected to the first central section end by a first connecting segment, and the first left flank section end connected to the second central section end by a second connecting segment, the at least one ac power source connected between the second right and left flank second ends.

3. The rail head electric induction heating apparatus of claim 2 wherein the right flank and left flank longitudinal sections are each one-half the length of the central longitudinal section.

4. The rail head electric induction heating apparatus of claim 3 wherein the central longitudinal section, the right flank longitudinal section and the left flank longitudinal section are each formed as a rectangular inductor; the central longitudinal section, the right flank longitudinal section and left flank longitudinal section, each having a facing surface, the facing surfaces of the right and left flank longitudinal sections angled towards the facing surface of the central longitudinal section.

5. The rail head electric induction heating apparatus of claim 1 wherein the central longitudinal section comprises a first partial central section having an opposing first and second, first partial central section ends, and a second partial central section having an opposing first and second, second partial central section ends, the right flank longitudinal section having an opposing first and second right flank section ends, the left flank longitudinal section having an opposing first and second left flank section ends, the first end of the first partial central longitudinal section connected to the first end of the right flank section, the first end of the second partial central section connected to the first end of the left flank section, the seconds ends of the first and second partial central sections located near each other, the at least one ac power supply connected between the second ends of the right flank and second partial central sections, and the second ends of the left flank and first partial central sections so that instantaneous current flow is either through the right flank section and then through the first partial central section, and through the second partial central section and then through the left flank section, or through the first partial central section and then through the right flank section, and through the left flank section and then through the second partial central section.

6. The rail head electric induction heating apparatus of claim 1 wherein the right side skirt inductor section comprises first and second partial right side skirt inductor sections, and the left side skirt inductor section comprises first and second partial left side skirt inductor sections; the first partial right side skirt inductor section having an opposing first and second, first partial right side skirt inductor section ends, the second partial right side skirt inductor section having an opposing first and second, second partial right side skirt inductor section ends, the first partial left side skirt inductor section having a first and second, first partial left side skirt inductor section ends, the second partial left side skirt inductor section having a first and second, second partial left side skirt inductor section ends, the first ends of the first partial right and left side skirt inductor section ends connected together by a first connecting segment, the first ends of the second partial right and left side skirt inductor section ends connected together by a second connecting segment, the second ends of the first and second partial right side skirt inductor sections located near each other, and the seconds ends of the first and second partial left side skirt inductor sections located near each other, a crossover section connecting the second ends of the second partial right side skirt inductor section and the first partial left side skirt inductor section, the at least one ac power supply connected between the second end of the first partial right side skirt inductor section and the second end of the second partial left side skirt inductor section.

7. The rail head electric induction heating apparatus of claim 6 wherein the first and second partial right and left side skirt inductor sections are each of the same length.

8. The rail head electric induction heating apparatus of claim 7 wherein the first and second partial right and left side skirt inductor sections are each formed as a rectangular inductor; the first and second right and left partial skirt inductor sections each having a facing surface, the facing surfaces of the first and second partial right and left side skirt inductor sections angled off of vertical and facing away from each other.

9. The rail head electric induction heating apparatus of claim 1, the right side skirt inductor section having an opposing first and second right side skirt inductor ends, the left side skirt inductor section having an opposing first and second left side skirt inductor ends, the first ends of the right and left side skirt inductor sections located near each other, the first ends of the right and left side skirt inductor sections connected together by a crossover section, the at least one ac power supply connected between the second ends of the right and left side skirt inductor sections.

* * * * *